United States Patent
Narikawa et al.

(10) Patent No.: US 10,194,124 B2
(45) Date of Patent: Jan. 29, 2019

(54) PROJECTION TYPE VIDEO DISPLAY DEVICE AND PROJECTION TYPE VIDEO DISPLAY METHOD

(71) Applicant: MAXELL, LTD., Kyoto (JP)

(72) Inventors: Sakiko Narikawa, Tokyo (JP); Naoki Mori, Tokyo (JP); Takashi Matsubara, Tokyo (JP); Yoshiho Seo, Tokyo (JP); Shoji Yamamoto, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/100,725

(22) PCT Filed: Dec. 19, 2013

(86) PCT No.: PCT/JP2013/084141
§ 371 (c)(1),
(2) Date: Jun. 1, 2016

(87) PCT Pub. No.: WO2015/092905
PCT Pub. Date: Jun. 25, 2015

(65) Prior Publication Data
US 2016/0309127 A1   Oct. 20, 2016

(51) Int. Cl.
*H04N 9/31* (2006.01)
*G06F 3/0346* (2013.01)
(Continued)

(52) U.S. Cl.
CPC .......... *H04N 9/3179* (2013.01); *G06F 1/3231* (2013.01); *G06F 3/011* (2013.01);
(Continued)

(58) Field of Classification Search
CPC ... H04N 9/3197; H04N 9/3129; H04N 9/3141
(Continued)

(56) References Cited

U.S. PATENT DOCUMENTS

| 6,359,612 B1* | 3/2002 | Peter | A61B 6/463 |
|---|---|---|---|
|  |  |  | 345/156 |
| 2005/0128578 A1* | 6/2005 | Sugawara | H04N 5/74 |
|  |  |  | 359/443 |

(Continued)

FOREIGN PATENT DOCUMENTS

| JP | 2012-104096 A | 5/2012 |
|---|---|---|
| JP | 2012-185630 A | 9/2012 |
| JP | 2013-065061 A | 4/2013 |

*Primary Examiner* — Jefferey F Harold
*Assistant Examiner* — Omer Khalid
(74) *Attorney, Agent, or Firm* — Volpe and Koenig, P.C.

(57) ABSTRACT

A projection type video display device includes a video projecting unit that displays a video by projecting the video onto a video projection plane, sensors and that detect an operator who operates the projection type video display device, operation detecting units and that detect a motion of the operator based on outputs of the sensors, and a control unit that controls the video projecting unit based on a detection result of the operation detecting unit. Preferably, a sensing area in which detections by the sensors are performed when a direction of the video projection plane is vertical and is set to differ from that when the direction of the video projection plane is horizontal.

7 Claims, 23 Drawing Sheets

TOP VIEW

(51) Int. Cl.
   *G06F 3/01*    (2006.01)
   *G06F 3/041*   (2006.01)
   *G06F 3/042*   (2006.01)

(52) U.S. Cl.
   CPC ............ *G06F 3/017* (2013.01); *G06F 3/0346* (2013.01); *G06F 3/0418* (2013.01); *G06F 3/0425* (2013.01)

(58) Field of Classification Search
   USPC .......................... 348/744; 356/51, 445, 614
   See application file for complete search history.

(56) References Cited

U.S. PATENT DOCUMENTS

| | | | |
|---|---|---|---|
| 2008/0111976 A1* | 5/2008 | Takito | G03B 21/10 353/121 |
| 2011/0080490 A1* | 4/2011 | Clarkson | G06F 3/017 348/222.1 |
| 2011/0116055 A1* | 5/2011 | Nakamura | G03B 21/14 353/82 |
| 2012/0075534 A1* | 3/2012 | Katz | H04N 9/3182 348/602 |
| 2012/0098865 A1* | 4/2012 | Takano | G03B 21/26 345/660 |
| 2013/0070232 A1 | 3/2013 | Izukawa | |
| 2013/0194174 A1* | 8/2013 | Bondan | G06F 3/005 345/156 |

\* cited by examiner

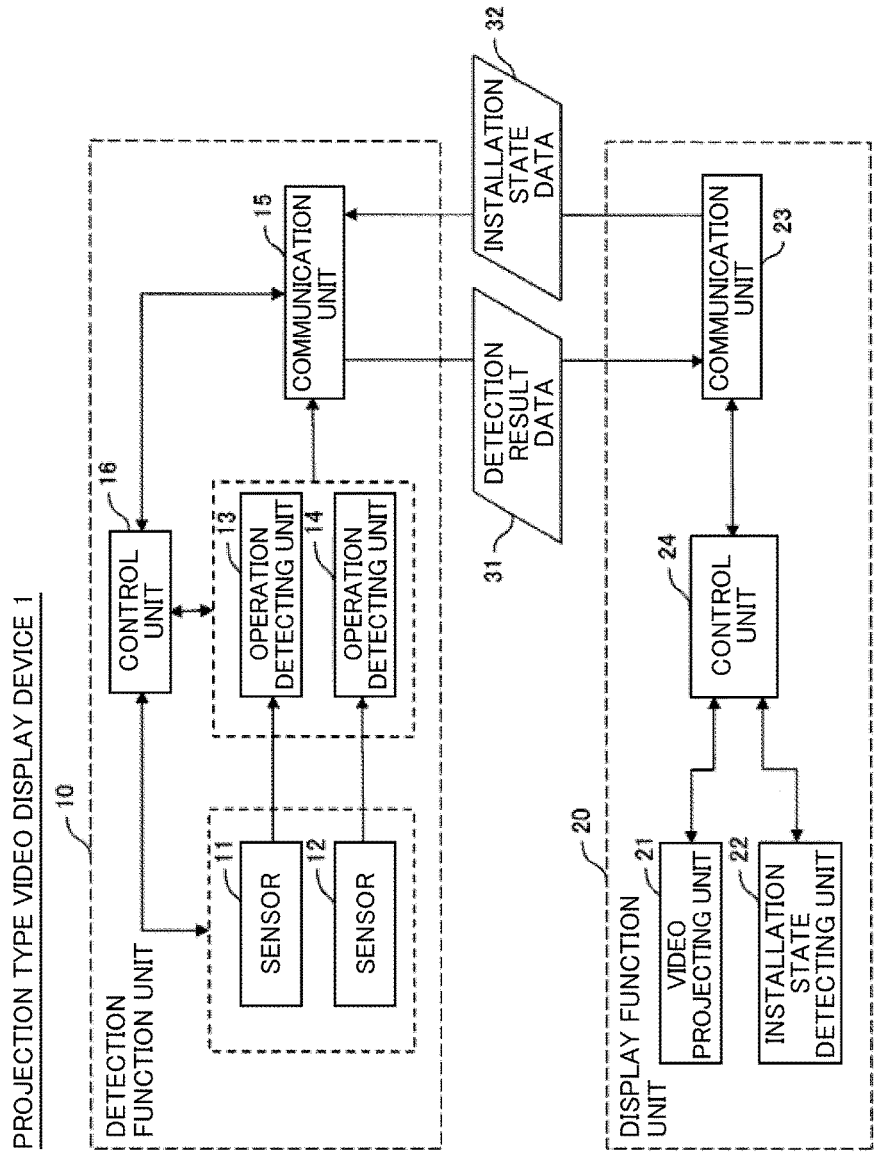

EXAMPLE IN WHICH OPERATION IS PERFORMED
ON VERTICAL PROJECTION PLANE

EXAMPLE IN WHICH OPERATION IS PERFORMED
ON HORIZONTAL PROJECTION PLANE

F I G. 3 A
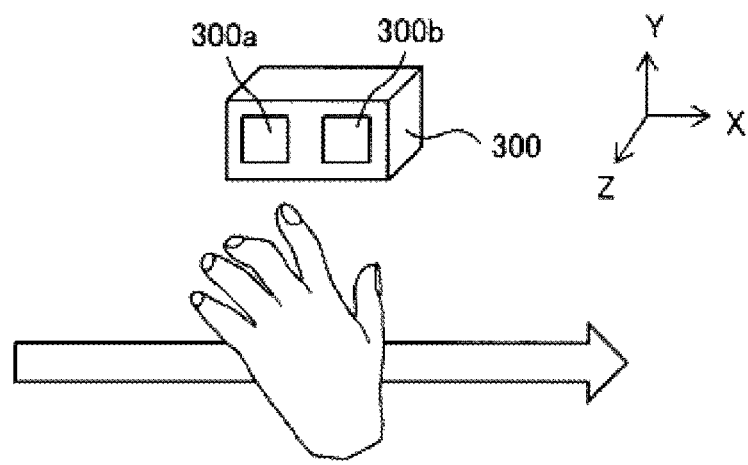
SWIPE OPERATION IN RIGHT DIRECTION
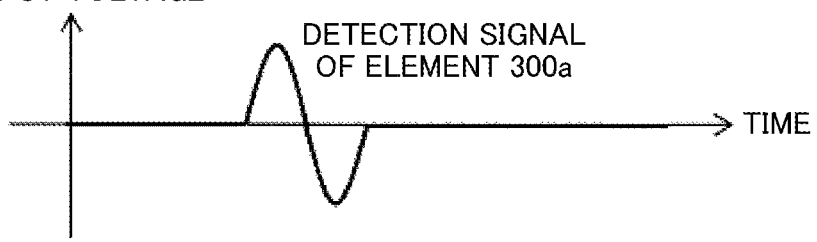
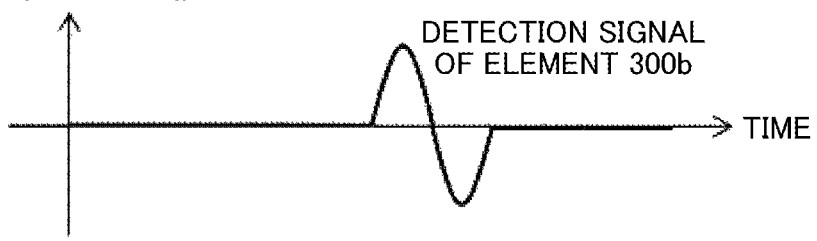

FIG. 3B
SWIPE OPERATION IN LEFT DIRECTION
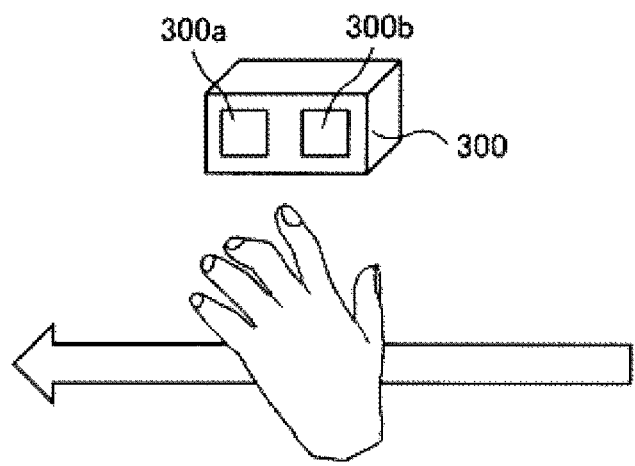
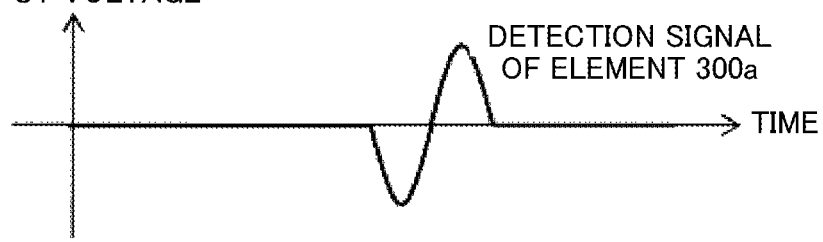
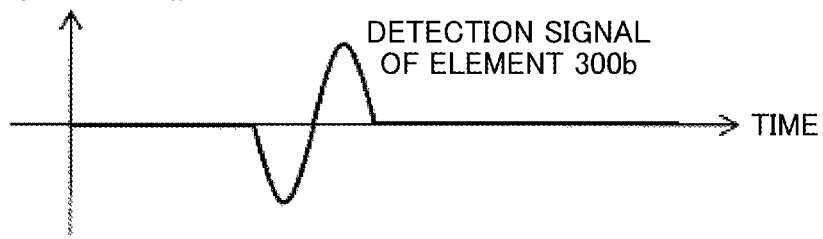

SENSING AREA BY ONE SENSOR

FRONT VIEW

TOP VIEW

SIDE VIEW

TOP VIEW (AREA INVERSION)

SENSING AREA BY TWO SENSORS

FRONT VIEW

TOP VIEW

SIDE VIEW

RELATION BETWEEN
PROJECTION PLANE AND SENSING AREA

VERTICAL PROJECTION PLANE (FRONT VIEW)

VERTICAL PROJECTION PLANE (SIDE VIEW)

HORIZONTAL PROJECTION PLANE (TOP VIEW)

HORIZONTAL PROJECTION PLANE (SIDE VIEW)

F I G. 7A
VERTICAL PROJECTION PLANE (SIDE VIEW)
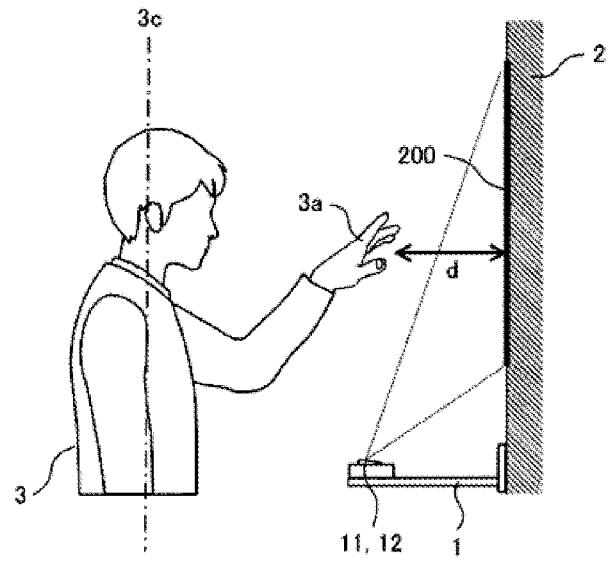
F I G. 7B
HORIZONTAL PROJECTION PLANE (SIDE VIEW)
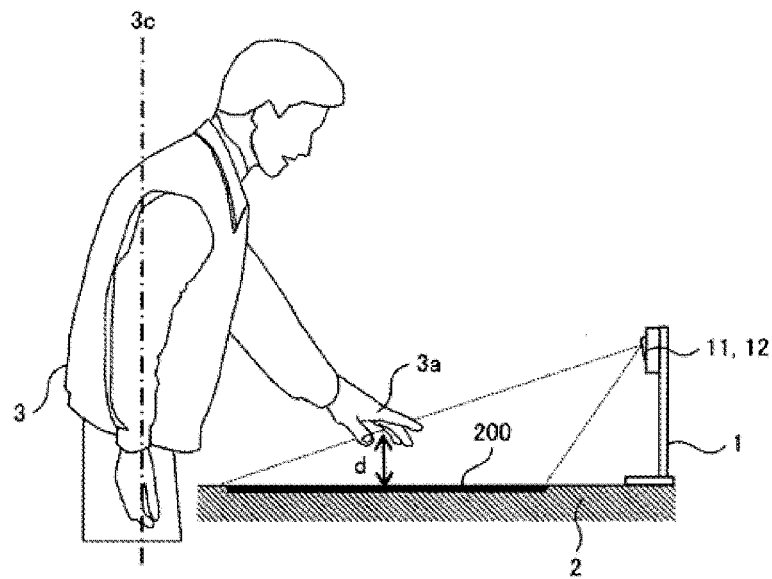

F I G. 8 A
VERTICAL PROJECTION PLANE (SIDE VIEW)
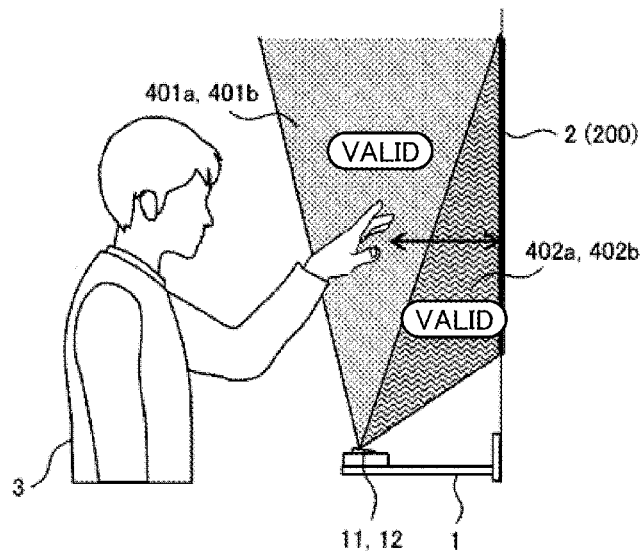
F I G. 8 B
HORIZONTAL PROJECTION PLANE (SIDE VIEW)
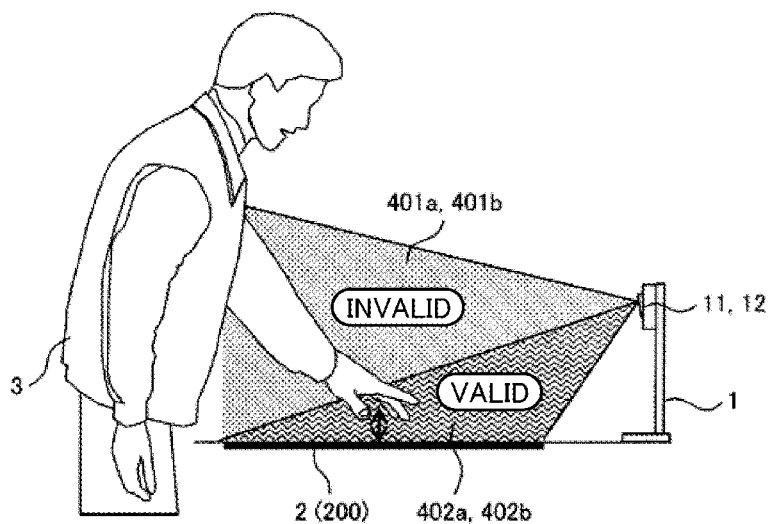

BEFORE SENSING AREA IS CORRECTED

F I G. 10B
AFTER SENSING AREA IS CORRECTED
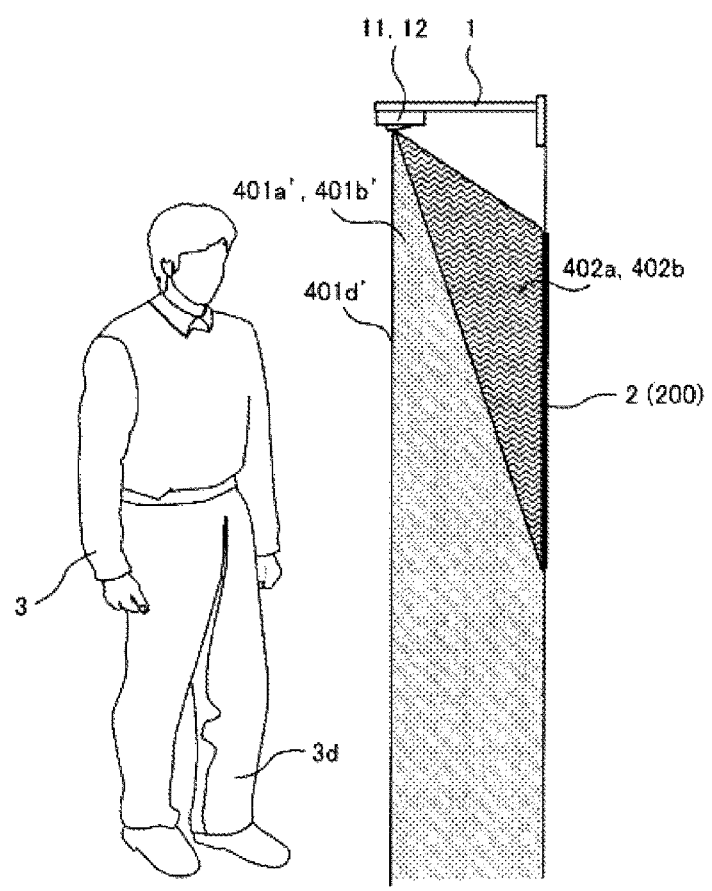

F I G. 1 1 A
RELATION WITH SENSOR INSTALLATION POSITION
FRONT VIEW OF SENSOR
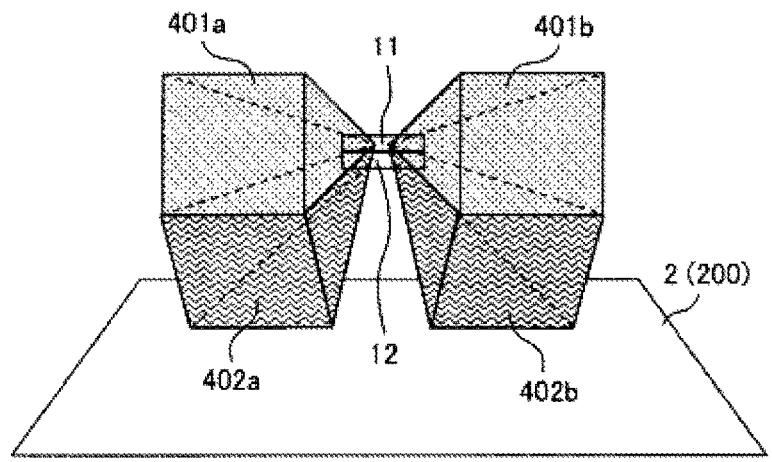
F I G. 1 1 B
VERTICAL PROJECTION PLANE,
SENSOR IS INSTALLED BELOW PROJECTION PLANE
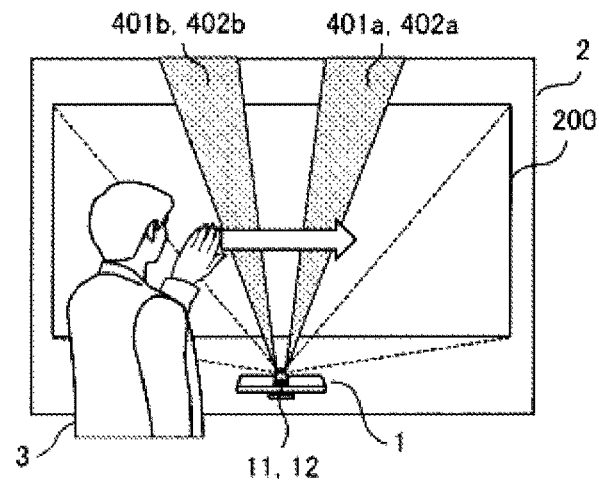

HORIZONTAL PROJECTION PLANE,
SENSOR IS INSTALLED IN FRONT OF PROJECTION PLANE

VERTICAL PROJECTION PLANE,
SENSOR IS INSTALLED ABOVE PROJECTION PLANE

F I G. 1 2 A
SENSING AREA ADJUSTMENT TECHNIQUE
TILT SUPPORT STAND
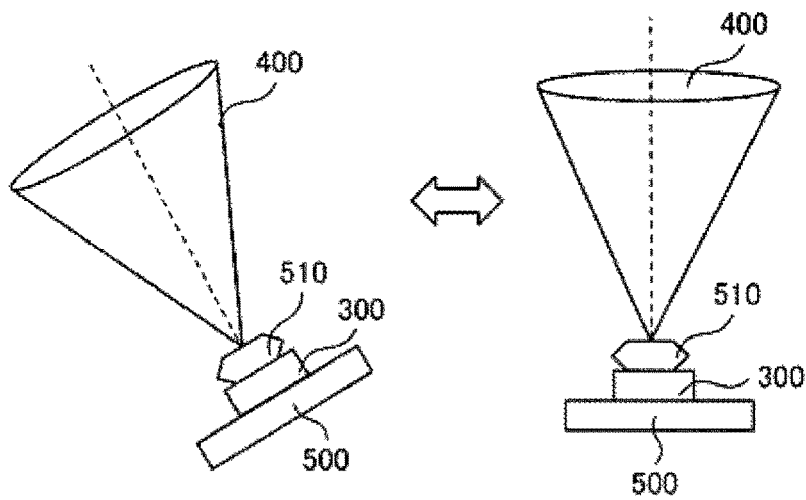
F I G. 1 2 B
CHANGE SHAPE OF MOVABLE LENS
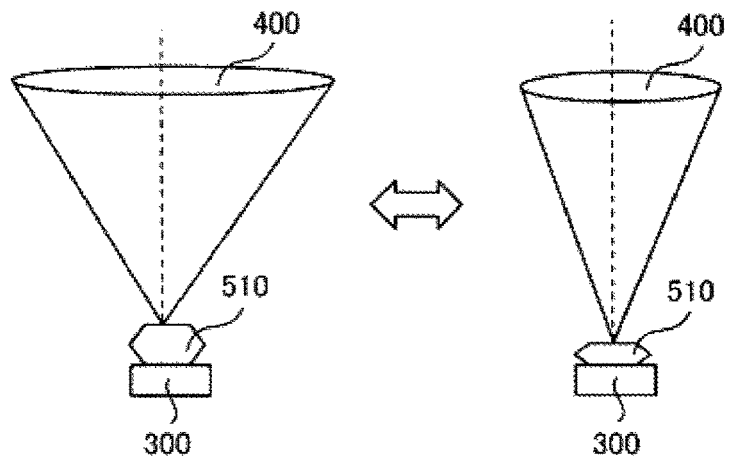

F I G. 1 2 C
MOVABLE SHIELDING PLATE
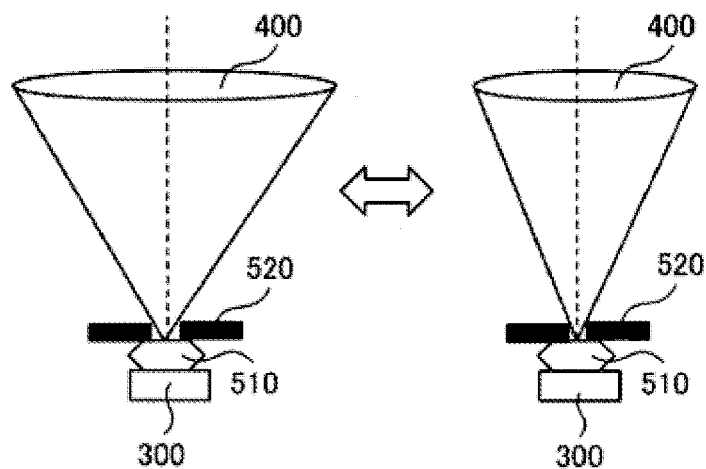
F I G. 1 2 D
VARIABLE ANGLE MIRROR
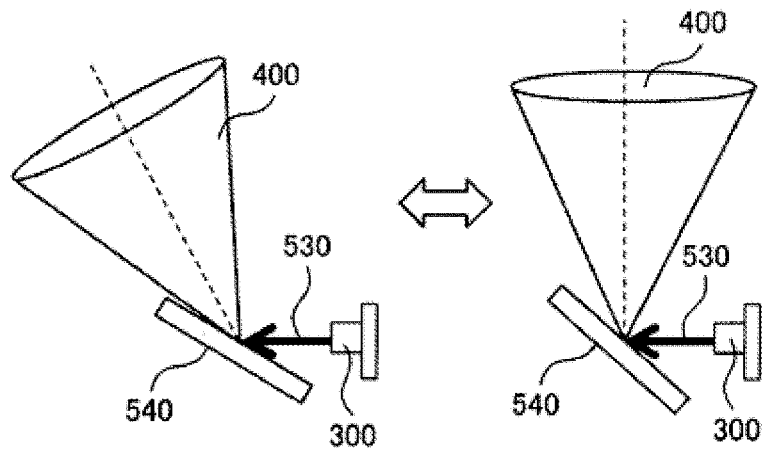

VERTICAL PROJECTION PLANE (SIDE VIEW)

HORIZONTAL PROJECTION PLANE (SIDE VIEW)

F I G. 16A
POSITION OF USER RELATIVE TO
HORIZONTAL PROJECTION PLANE (TOP VIEW)
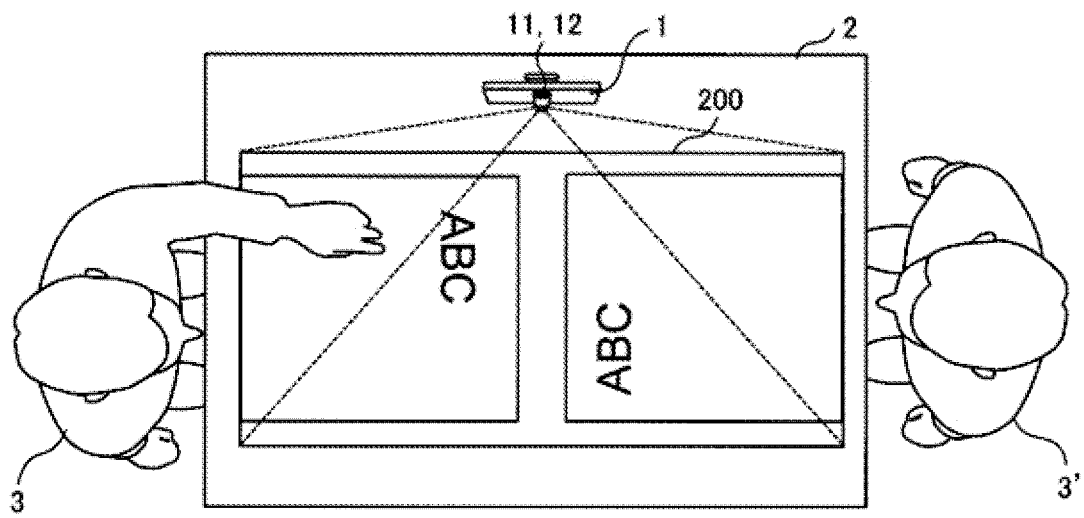
F I G. 16B
SETTING OF SENSOR AREA (SIDE VIEW)
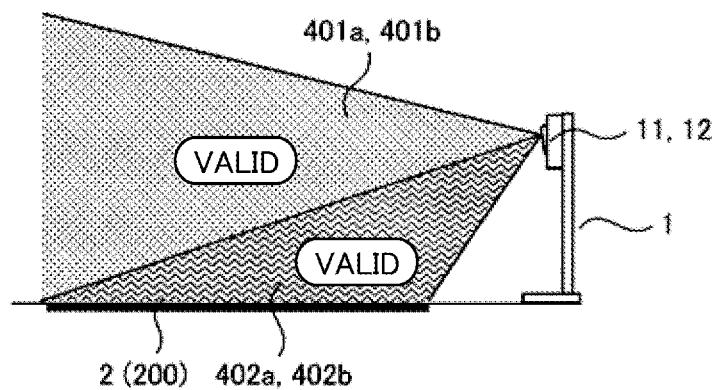

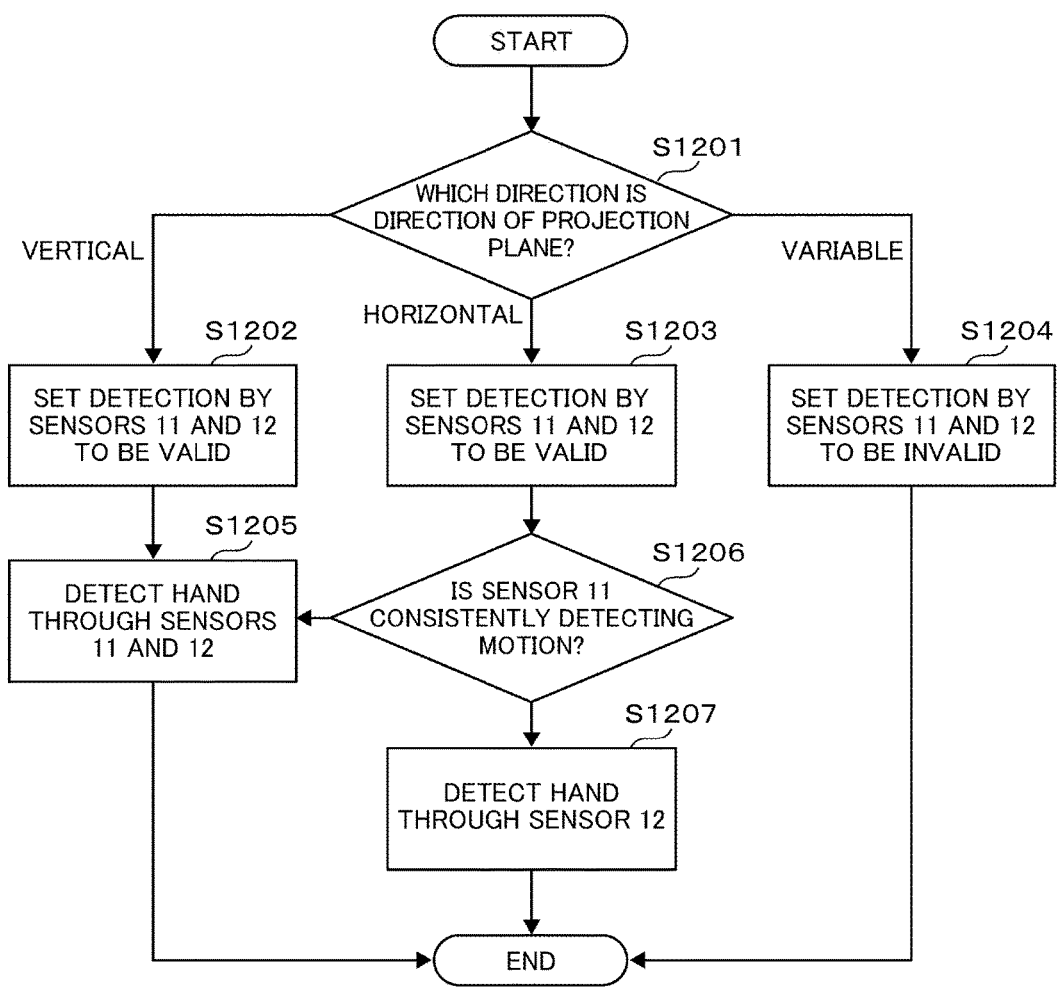
F I G. 1 7

PROJECTION TYPE VIDEO DISPLAY DEVICE AND PROJECTION TYPE VIDEO DISPLAY METHOD

TECHNICAL FIELD

The present invention relates to a projection type video display device and a projection type video display method, which are capable of detecting an operation of a user and displaying a video.

BACKGROUND ART

In relation to the technical field of the present invention, Patent Document 1 discloses a configuration including an input unit that receives an image of a subject imaged by an imaging unit and a projecting unit that projects a first image according to a position (or a position of a hand of the subject) of the subject imaged by the imaging unit in order to provide a projection device convenient for the user. For example, a technique of projecting a pointer onto a screen according to a position of a hand of a subject is described.

CITATION LIST

Patent Document

Patent Document 1: JP 2012-185630 A

SUMMARY OF THE INVENTION

Problems to be Solved by the Invention

In the technique disclosed in Patent Document 1, a position of the user (operator) is detected on the assumption that a video projection plane (a screen) onto which an image is projected is vertically installed on a wall or the like, but a case in which the projection plane is horizontally installed is not considered. As will be described later, the position of the user (the position of the hand) relative to the projection plane when an installation direction of the projection plane is vertical differs from that when the installation direction of the projection plane is horizontal. For this reason, even in the case of a projection device suitable for a case in which a projection plane is vertically installed, when the projection plane is horizontally installed, it may be hard to detect the operation of the user accurately, and thus there is a problem in that a function of the projection device declines.

It is an object of the present invention to provide a projection type video display device and a projection type video display method, which are capable of accurately detecting the operation of the user (the operator) even when the video projection plane is horizontally installed as well as when the video projection plane is vertically installed.

Solutions to Problems

The present invention provides a projection type video display device including a video projecting unit that displays a video by projecting the video onto a video projection plane, a sensor that detects an operator who operates the projection type video display device, an operation detecting unit that detects a motion of the operator based on an output of the sensor, and a control unit that controls the video projecting unit based on a detection result of the operation detecting unit, wherein a setting is performed so that a sensing area in which detection by the sensor is performed when a direction of the video projection plane is horizontal differs from the sensing area when a direction of the video projection plane is vertical. Herein, it is preferable that the sensing area of the sensor when the direction of the video projection plane is horizontal be narrower than that when the direction of the video projection plane is vertical.

Effects of the Invention

According to the present invention, it is possible to accurately detect the operation of the user regardless of the direction of the video projection plane or the installation state of the projection type video display device. Thus, operability and usability of the user in the projection type video display device are improved.

BRIEF DESCRIPTION OF THE DRAWINGS

FIG. 1 is a configuration diagram illustrating an example of a projection type video display device according to the present invention (a first embodiment).

FIGS. 3A and 3B are diagrams for describing a detection principle of an operation of a user by a pyroelectric sensor.

FIGS. 7A and 7B are diagrams illustrating position relations between a projection plane and a user.

FIGS. 8A and 8B are diagrams illustrating setting of a sensing area according to a direction of a projection plane.

FIGS. 10A and 10B are diagrams for describing correction of a sensing area in suspension installation.

FIGS. 11A to 11D are diagrams illustrating relations between an installation place of a sensor and a detection timing.

FIGS. 12A to 12D are diagrams illustrating examples in which a movable mechanism is installed in a sensor to adjust a sensing area.

FIGS. 16A and 16B are diagrams illustrating an example of setting a sensing area according to a position of the user (a third embodiment).

FIG. 17 is a flowchart illustrating a sensing area setting process.

MODE FOR CARRYING OUT THE INVENTION

Figure 2A:
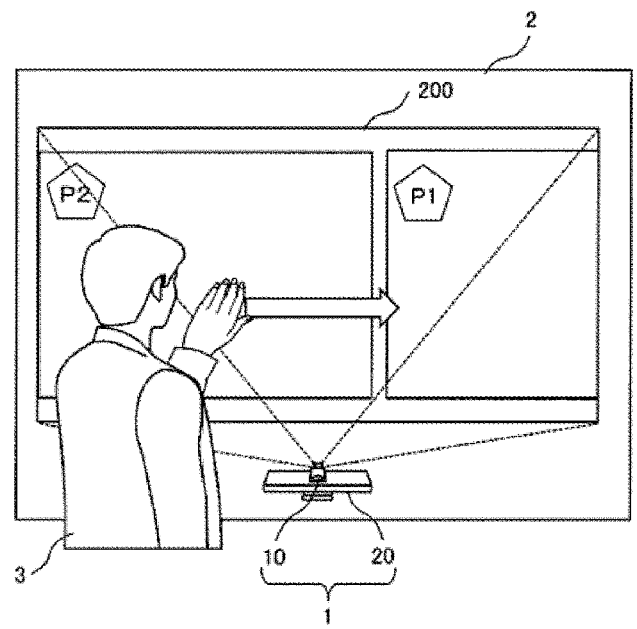
FIGS. 2A and 2B are diagrams illustrating examples of a usage form of a projection type video display device.

Hereinafter, embodiments will be described with reference to the appended drawings.

First Embodiment

A first embodiment will be described in connection with an example in which a sensing area for detecting an operation of the user (the operator) is suitably set according to an installation state of a projection type video display device or a direction of a video projection plane (hereinafter, referred to as a "projection plane") onto which a video is projected.

FIG. 1 is a configuration diagram illustrating an example of the projection type video display device according to the present invention. A projection type video display device 1 (hereinafter, referred to as a "display device") includes a detection function unit 10 that detects the operation of the user and a display function unit 20 that causes a video to be displayed on the projection plane. The detection function unit 10 includes two sensors 11 and 12, two operation detecting units 13 and 14, a communication unit 15, and a control unit 16. The display function unit 20 includes a video projecting unit 21, an installation state detecting unit 22, a communication unit 23, and a control unit 24. The detection function unit 10 and the display function unit 20 may be configured with independent devices. The components 11 to 16 and 21 to 24 may be configured with one or more components as necessary. For example, the components 13 to 16 can perform a process through one or more central processing unit (CPUs). Some components of the detection function unit 10 and the display function unit 20 may be arranged outside them and connected via a network or a universal serial bus (USB).

In the detection function unit 10, the sensors 11 and 12 detects the presence of the user, particularly, the motion of the hand, for example, using the pyroelectric sensor. The sensor includes a lens, a circuit board, and the like in addition to a pyroelectric detection element. Using a plurality of sensors (the two sensors), it is possible to set a plurality of detection areas (sensing areas) and switch an area to be used. Besides, a thermopile type sensor, a camera, a distance measuring sensor, an ultrasonic sensor, a capacitive sensor, a light detecting sensor, or the like may be used as the sensor.

The operation detecting units 13 and 14 detect a motion of the user from detection signals of the sensors 11 and 12 and are configured with a circuit board, software, or the like. The communication unit 15 is an interface for performing transmission and reception of data such as a detection result with the display function unit 20 and configured with a network connection, a USB connection, an ultrasonic unit, an infrared communication device, a visible light communication device, a wireless communication device, or the like. The control unit 16 controls the sensors 11 and 12, the operation detecting units 13 and 14, and the communication unit 15 and is configured with a circuit board, software, or the like. Particularly, the control unit 16 performs control such that the sensing area by the sensors 11 and 12 is switched.

In the display function unit 20, the video projecting unit (hereinafter, a "projecting unit") 21 is configured with a light source, a video display element (for example, a liquid crystal panel), a projection lens, or the like, and projects a video signal supplied from a video device (not illustrated) to be displayed on the projection plane (a screen, a desk, or the like). The installation state detecting unit 22 detects a state in which the display device 1 (the display function unit 20) is installed or a direction of the projection plane, and a gravity sensor, a gyro sensor, an acceleration sensor, a magnetic sensor, an altitude sensor, an inclination sensor, or the like may be used as the sensor.

The communication unit 23 is an interface for performing transmission and reception of data such as the installation state with the detection function unit 10 and configured with a network connection, a USB connection, an ultrasonic unit, an infrared communication device, a visible light communication device, a wireless communication device, or the like. The video signal is input from the video device (not illustrated) to the communication unit 23. The control unit 24 controls the projecting unit 21, the installation state detecting unit 22, and the communication unit 23 and is configured with a circuit board, software, or the like. Particularly, the control unit 24 controls a video to be displayed by the projecting unit 21 based on detection data of the operation of the user.

The detection function unit 10 outputs detection result data 31 to the display function unit 20 through the communication unit 15. The data 31 includes information such as a kind of the operation of the user, a direction of an operation, a speed of an operation, a position of an operation, or a magnitude of an operation. The display function unit 20 outputs installation state data 32 to the detection function unit 10 through the communication unit 23. The data 32 includes information such as the installation state of the display device (the display function unit 20) or the direction of the projection plane.

Figure 2B:
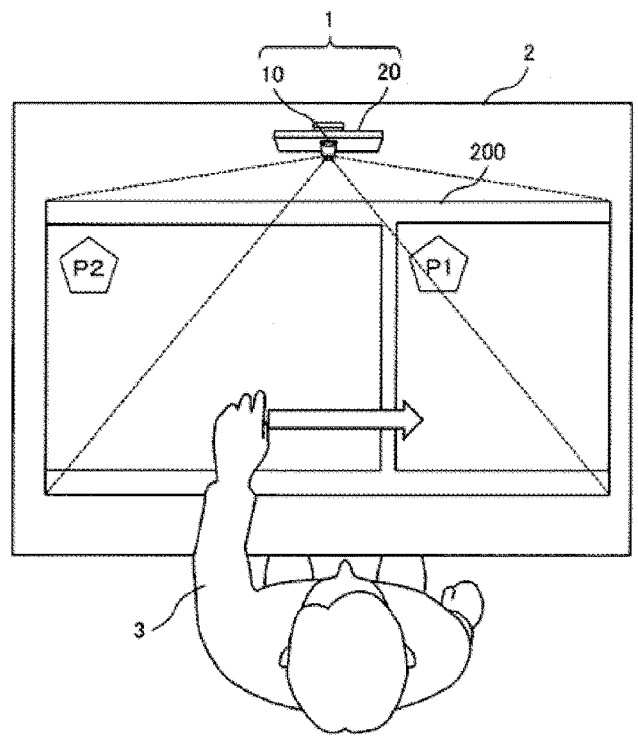

FIGS. 2A and 2B are diagrams illustrating examples of usage forms of the projection type video display device. The projection type video display device 1 is an example of a projector (an ultrashort projection model) that performs projection on the video projection plane 2 such as the screen or the desk at close range, and a state in which the projection plane 2 is viewed in front is illustrated. Using the display device (projector) 1, it is possible to project a video regardless of whether the projection plane 2 is a vertical plane or a horizontal plane, and an installation direction may be rotated 90°.

FIG. 2A illustrates a usage form in which a video is projected onto the vertical projection plane 2 such as a wall or a screen, the display device 1 is installed below the projection plane 2, and a projection direction is an upward direction (a vertical oblique direction). A user 3 moves a video (a slide) from P1 to P2 by standing in front of the projection video 200, putting a hand in front of a video, and performing an operation of moving a hand, for example, from left to right. FIG. 2B illustrates a usage form in which a video is projected onto the horizontal projection plane 2 such as a top board of a desk, the display device 1 is installed ahead of the projection plane 2, and a projection direction is a forward direction (a horizontal oblique direction). The user 3 moves the video from P1 to P2 by standing at a position at which the user 3 looks at the projection video 200 from above, putting a hand above the video, and performing an operation of moving a hand, for example, from left to right.

The operation of the user 3 is detected by the detection function unit 10 incorporated in to the display device 1. In this example, the sensors 11 and 12 are arranged near the projecting unit 21. The detection result of the detection function unit 10 is transferred to the display function unit 20, and control may be performed such that a slide goes to a next page or a previous page in conjunction with the operation of the user, or the video may be switched. The operation of the user is detected using the sensors 11 and 12, but a detection method using a pyroelectric sensor will be described herein.

FIG. 3 is a diagram for describing a detection principle of the operation of the user using the pyroelectric sensor. A pyroelectric sensor 300 is commonly employed in a motion sensor that detects the presence of a person, and generates a voltage when an object that radiates infrared rays such as a human body or a part of a body passes in front of a pyroelectric detection element. The pyroelectric sensor 300 including two detection elements 300a and 300b herein will be described as an example.

FIG. 3A illustrates detection signal waveforms of the elements 300a and 300b when the elements 300a and 300b are arranged from side to side (in an X direction), and a left-to-right swiping operation is performed in front of the elements 300a and 300b. The reason why a signal waveform has a bipolar pulse is because each element has a dual element configuration. A detection timing of the element 300a is earlier than a detection timing of the element 300b by a predetermined time, and thus the left-to-right swiping operation can be determined to have been performed.

FIG. 3B illustrates detection signal waveforms of the elements 300a and 300b when the elements 300a and 300b are arranged from side to side (in an X direction), and a right-to-left swiping operation is performed in front of the elements 300a and 300b. A detection timing of the element 300b is earlier than a detection timing of the element 300a by a predetermined time, and thus the right-to-left swiping operation can be determined to have been performed.

The output of the pyroelectric sensor may be an electric current instead of a voltage. The signal waveform output from the sensor may be a different shape from the shapes illustrated in FIGS. 3A and 3B due to the structure of the element.

The detection element of the pyroelectric sensor can detect infrared rays and generate a voltage as a single element, but in the single element, directional characteristics of a detection range (a sensing area) are fixed. For this reason, the area was corrected using a Fresnel lens so that a desired sensing area is formed. A sensing area of a pyroelectric sensor into which the Fresnel lens is incorporated will be described.

Figure 4A:
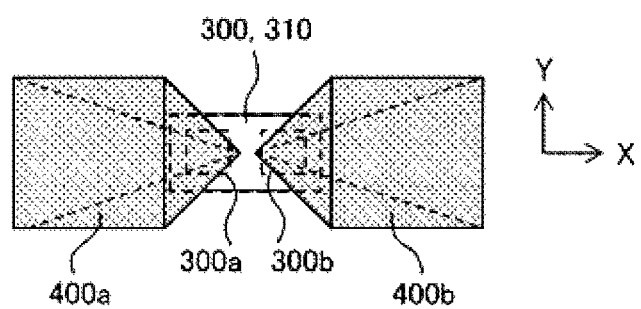
FIGS. 4A to 4D are diagrams illustrating sensing areas by one pyroelectric sensor.
Figure 4B:
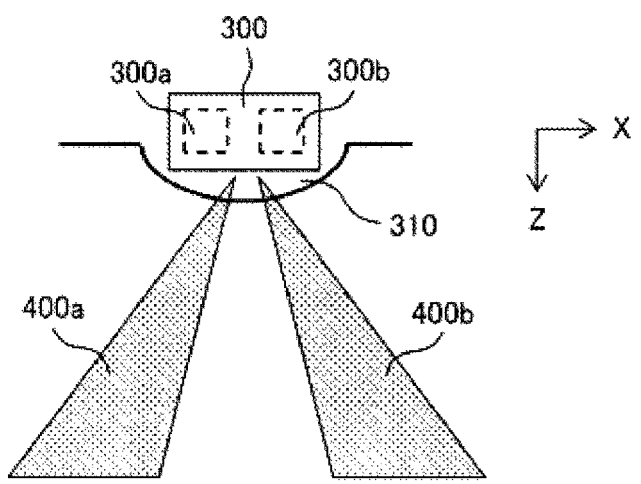
Figure 4C:
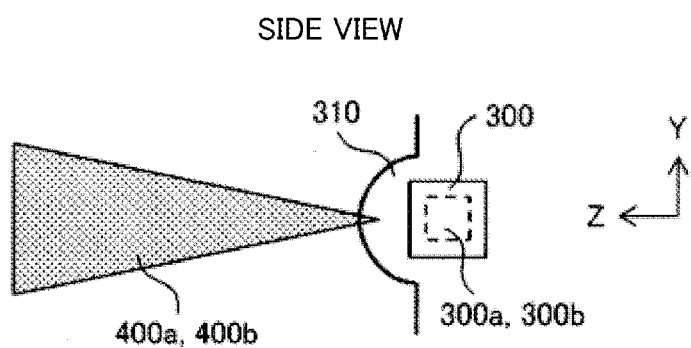

FIGS. 4A to 4D are diagrams illustrating a sensing area by one pyroelectric sensor. FIG. 4A is a diagram illustrating the sensor 300 that is viewed from the front (in a Z direction), FIG. 4B is a diagram illustrating the sensor 300 that is viewed from the top (in a Y direction), and FIG. 4C is a diagram illustrating the sensor 300 that is viewed from the side (in the X direction).

Figure 4D:
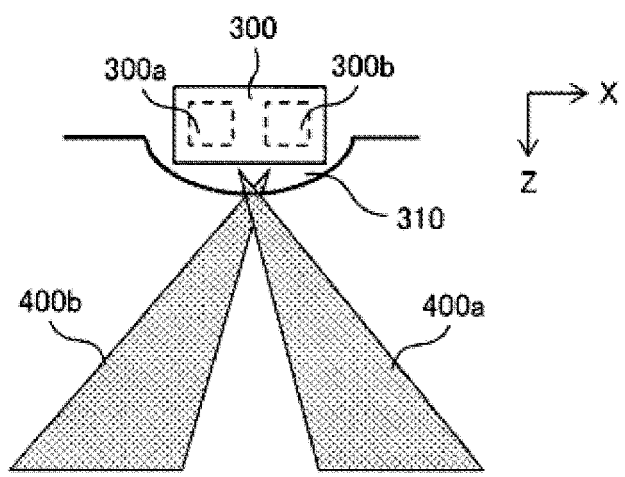

Sensing areas of the detection elements 300a and 300b of the pyroelectric sensor 300 are denoted by 400a and 400b. When the Fresnel lens 310 is incorporated into the sensor 300, the sensing area can be narrowed using the elements as a starting point. Here, a sensing area that radially spreads out a desired angle (in a quadrangular pyramid shape) is performed. Sensing areas 400a and 400b are separated into two in a direction (the X direction) (in which the elements are arranged, and there is a detection dead zone between the two sensing areas 400a and 400b. When a human body or a part of a body traverses the sensing area of each element, the corresponding element generates the detection signal. At this time, since there is the dead zone, it is possible to more accurately detect a direction of a motion of a mobile object. Further, by changing the shape of the Fresnel lens 310, it is possible to invert a position relation of the element and the sensing area in the X direction as illustrated in FIG. 4D.

Figure 5A:
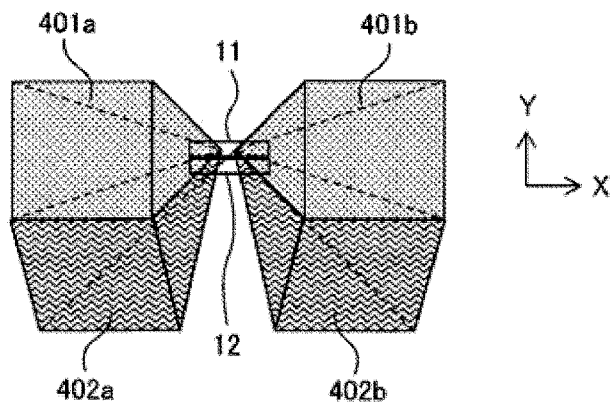
FIGS. 5A to 5C are diagrams illustrating sensing areas by two pyroelectric sensors.
Figure 5B:
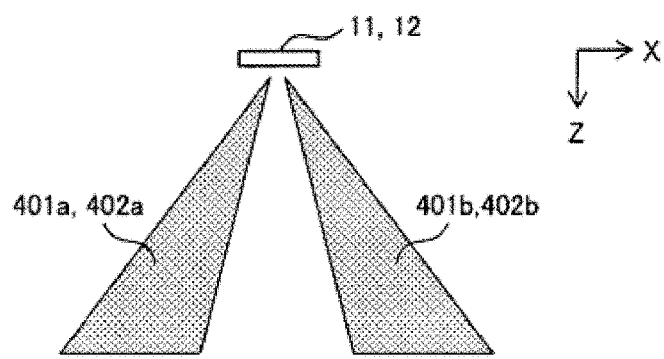
Figure 5C:
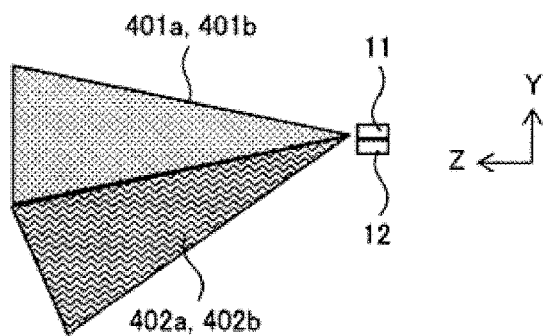

FIGS. 5A to 5C are diagrams illustrating sensing areas of two pyroelectric sensors. In the present embodiment, two pyroelectric sensors 11 and 12 in each of which the two pyroelectric sensors 300 illustrated in FIGS. 4A to 4D are combined are arranged in a vertical direction (the Y direction). FIG. 5A is a diagram illustrating the sensors 11 and 12 that are viewed from the front (in the Z direction), FIG. 5B is a diagram illustrating the sensors 11 and 12 that are viewed from the top (in the Y direction), and FIG. 5C is a diagram illustrating the sensors 11 and 12 that are viewed from the side (in the X direction). Sensing areas of the sensors 11 and 12 are denoted by 401 and 402, and the sensing areas are formed to be adjacent in the Y direction. The areas are separated into 401a and 401b and 402a and 402b by the two detection elements arranged in the X direction. As a result, there are four sensing areas that are separated in the horizontal direction (the X direction) and the vertical direction (the Y direction).

Figure 6A:
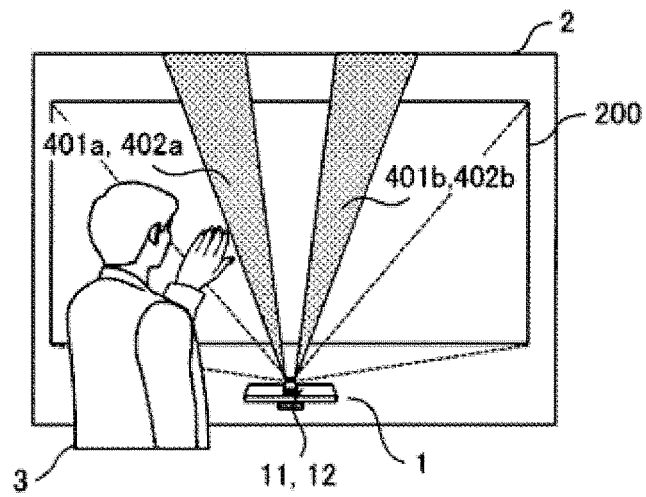
FIGS. 6A to 6D are diagrams illustrating position relations between a projection plane and a sensing area.
Figure 6B:
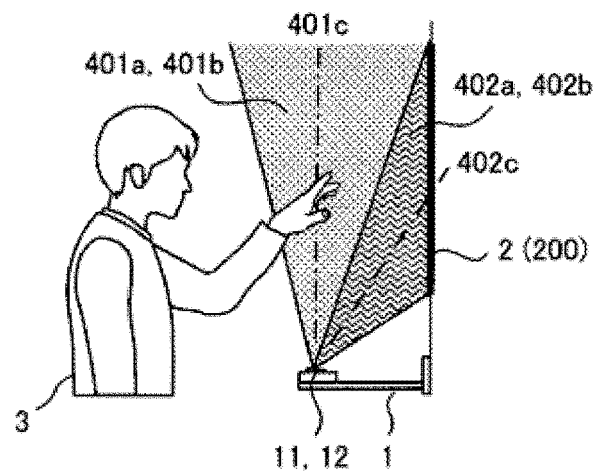
Figure 6C:
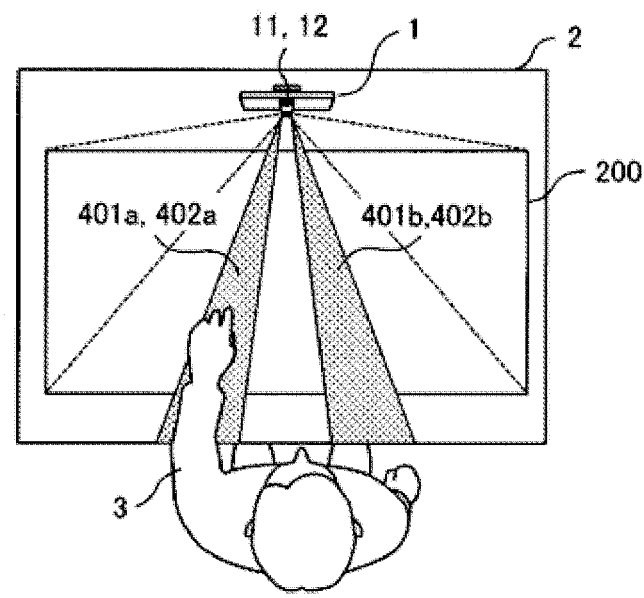
Figure 6D:
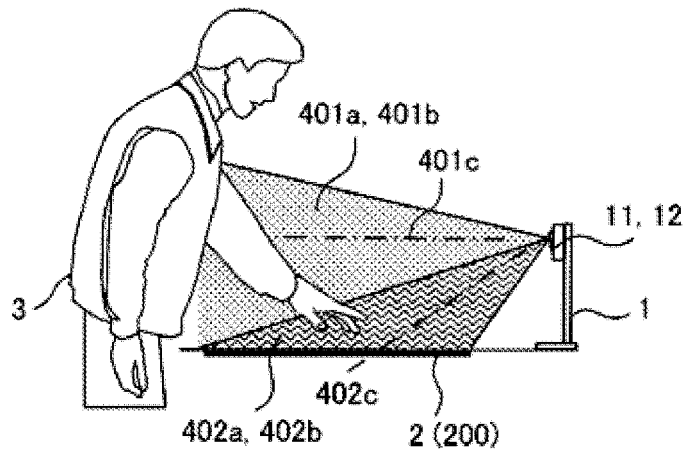

FIGS. 6A to 6D are diagrams illustrating position relations between a projection plane and a sensing area. FIGS. 6A and 6B illustrate examples of a vertical projection plane, and FIGS. 6C and 6D illustrate examples of a horizontal projection plane.

In order to detect the user 3 who performs an operation on the projection plane 2, the two sensors 11 and 12 illustrated in FIGS. 5A to 5C are used, the sensor is arranged to cover an area away from the projection plane 2, and the sensor 12 is arranged to cover an area close to the projection plane 2. Specifically, as illustrated in the side views of FIGS. 6B and 6D, sensing areas 401a and 401b of the sensor 11 are formed such that a central axis 401c is substantially parallel to the projection plane 2, and sensing areas 402a and 402b of the sensor 12 are formed such that a central axis 402c obliquely intersects with the projection plane 2, preferably, at a position near the center of the projection video 200. When an operation is performed such that the hand of the user 3 traverses the sensing areas 401a and 401b or the sensing areas 402a and 402b from left to right, the element of the sensor 11 or 12 can generate the detection signal and detect the operation of the user.

FIGS. 7A and 7B are diagrams illustrating a position relation between the projection plane and the user. FIG. 7A illustrates an example in the case of the vertical projection plane, and FIG. 7B illustrates an example in the case of the horizontal projection plane.

When the user 3 performs an operation on the vertical projection plane of FIG. 7A, an axis 3c of the body of the user and the projection plane 2 are in a substantially parallel position relation. The user 3 who performs an operation often stands at a position slightly away from the projection plane 2. It is because when the body of the user 3 is close to the projection plane 2, it is not easy for other users who are behind the user to see the projection video 200 of the projection plane 2, and the user 3 stands at a position away from the projection plane 2 intentionally to avoid this situation. As a result, a distance d from the projection plane 2 to a finger 3a is commonly large.

When the user 3 performs an operation on the horizontal projection plane of FIG. 7B, the axis 3c of the body of the user and the projection plane 2 are in a substantially vertical position relation. At this time, since the user 3 who performs an operation need no be conscious of the fact that the projection video 200 is blocked by the body of the user, the distance d from the projection plane 2 to the finger 3a is commonly small.

As described above, a direction 3c of the body of the user 3 relative to the projection plane 2 and the distance d from the projection plane to the finger 3a when the projection plane 2 is vertical differs from those when the projection plane 2 is horizontal. Thus, in order to correctly detect the operation of the user 3, it is necessary to appropriately set the sensing area according to the direction of the projection plane.

FIGS. 8A and 8B are diagrams illustrating settings of the sensing area according to the direction of the projection plane. FIG. 8A illustrates an example in the case of the vertical projection plane, and FIG. 8B illustrates an example in the case of the horizontal projection plane.

In the case of the vertical projection plane of FIG. 8A, since the distance d from the projection plane 2 to the finger 3a of the user is large as described above with reference to FIG. 7A, the motion of the hand of the user 3 is detected in a distant area. In other words, the sensing areas 401a and 401b of the sensor 11 in FIG. 6B are set to be valid. Further, since the finger 3a of the user 3 may approach the projection plane 2, the sensing areas 402a and 402b of the sensor 12 are also set to be valid.

In the case of the horizontal projection plane of FIG. 8B, since the distance d from the projection plane 2 to the finger 3a of the user is small as described above with reference to FIG. 7B, the motion of the hand of the user 3 is detected in a close area. In other words, the sensing areas 402a and 402b of the sensor 12 in FIG. 6D are set to be valid. At this time, the axis 3c of the body of the user 3 and the projection plane 2 are in the substantially vertical position relation, and a portion (here, an arm of the user or the like) other than the finger 3a of the user 3 may enter the sensing areas 401a and 401b of the sensor 11. When a motion of a portion other than the finger 3a of the user 3 detected by the sensor 11 is added to the detection signal, the operation of the user is likely to be erroneously detected. Thus, the detection in the sensing areas 401a and 401b of the sensor 11 is set to be invalid. As described above, the sensing area to be used is selected and set according to the direction of the projection plane 2.

The valid/invalid setting of the detection by the sensors 11 and 12 is performed by turning on or off an electric connection between the sensors 11 and 12 and the operation detecting units 13 and 14 in FIG. 1 or turning on or off a detection process operations of the operation detecting units 13 and 14. The on/off switching is performed by the control unit 16. There is an effect that unnecessary power consumption in the detection function unit 10 can be suppressed by invalidating the detection process.

It is determined whether the direction of the projection plane 2 is vertical or horizontal, for example, based on a gravity direction detected using a gyro sensor or a gravity sensor in the installation state detecting unit 22 and the installation state (the projection direction) of the display device 1. Alternatively, the projection direction of the display device 1 may be determined based on a level of luminance of a back side (the lower side in FIG. 8A and the right side in FIG. 8B) of the display device 1 measured using a luminance sensor. Besides, an acceleration sensor, a magnetic sensor, an altitude sensor, an inclination sensor, or the like may be used. Alternatively, the direction of the projection plane may be input by the user operating a remote controller, a button, a switch, or the like. The data 32 of the installation state of the display device 1 acquired as described above is transferred to the control unit 16 of the detection function unit 10, and the operation detecting units 13 and 14 are controlled such that the sensing areas are selected and selected.

The direction of the projection plane 2 may be neither vertical nor horizontal, and the projection plane 2 may be obliquely installed at an intermediate angle. In this case, it may be determined whether an inclination angle is closer to the vertical direction or the horizontal direction. Alternatively, a sensor to be used for an inclination angle may be decided and applied based on an angle range of each of the sensing areas covered by the two sensors 11 and 12. Further, when the detection signal transferred from the installation state detecting unit 22 varies, it may indicate that the display device 1 is moving or being installed. In this case, the operation of the user is regarded as being not performed, and the detections of both the sensors 11 and 12 are invalidated.

Figure 9:
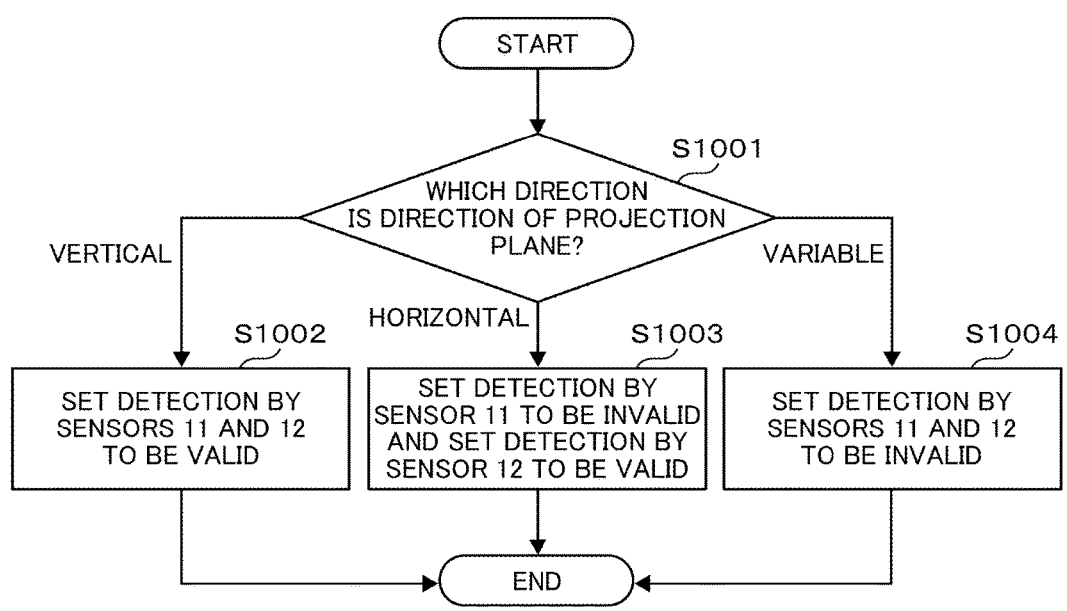
FIG. 9 is a flowchart illustrating a sensing area setting process.

FIG. 9 is a flowchart illustrating a sensing area setting process.

First, in S1001, the installation state detecting unit 22 determines the direction of the projection plane. As a determination method, the direction of the projection plane is determined based on the installation state (the projection direction) of the display device 1 using a gyro sensor. The process proceeds to S1002 when the direction of the projection plane is vertical and proceeds to S1003 when the direction of the projection plane is horizontal. At this time, since there is a case in which the direction of the projection plane is oblique, a threshold value of an inclination angle is set, and the direction of the projection plane is determined to be vertical or horizontal by a comparison with the threshold value. However, when the direction of the projection plane varies, the operation of the user is determined to have not been performed, and the process proceeds to S1004.

In S1002, the control unit 16 sets both of the detections by the sensors 11 and 12 to be valid. In S1003, the detection by the sensor 11 is set to be invalid, and the detection by the sensor 12 is set to be valid. In S1004, both of the detections by the sensors 11 and 12 are set to be invalid. This setting is switched by controlling the operation detecting units 13 and 14 through the control unit 16.

In FIG. 9, the process ends after S1001 to S1004, but actually, by repeatedly performing the flow, it is possible to cope with even the case in which the direction of the projection plane is changed in the middle.

Next, modifications of the present embodiment will be described.

In the above embodiment, when the projection plane 2 is vertical, the display device 1 is installed below the projection plane 2, and the video is projected upward. On the other hand, when the projection plane 2 is vertical, a usage form (suspension installation) in which the display device 1 hangs on a ceiling or a wall, and the video is projected downward is also possible. In this case, it is desirable to correct the shape of the sensing area.

Figure 10A:
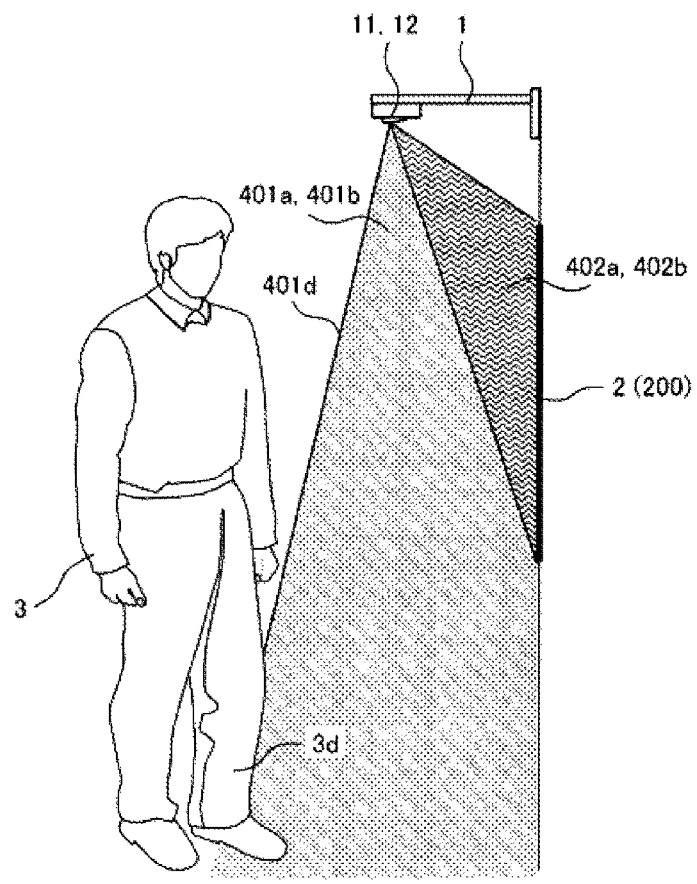

FIGS. 10A and 10B are diagrams for describing correction of the sensing area in the suspension installation. The display device 1 is installed in an overhead direction of the user 3, and the video is projected on to the vertical projection plane 2. FIG. 10A illustrates an example in which the sensing area is set in the same manner as in FIG. 8A, and FIG. 10B illustrates an example in which the sensing area is corrected and set.

In the case of FIG. 10A, when the display device 1 is installed in the suspension installation manner, a foot 3d of the user 3 standing at a position close to the projection plane 2 may enter the sensing areas 401a and 401b of the sensor 11. When the sensor 11 reacts to the foot 3d of the user, it is erroneous detection. In order to prevent this, the shapes of the sensing areas of the sensor 11 is corrected to areas 401a' and 401b' illustrated in FIG. 10B. In other words, a boundary 401d of the areas 401a and 401b at the user side is brought to be close to the projection plane 2 so that a boundary 401d' is substantially parallel to the projection plane 2. As a result, the foot 3d of the user 3 is unlikely to be detected. The area correction is preferably performed by changing a mounting posture of the sensor 11 according to the installation state (suspension installation) of the display device 1 as will be described later with reference to FIG. 12.

As described above, each of the sensors 11 and 12 includes the two detection elements, and the operation direction (left to right or right to left) of the user is determined based on the fact that one of the detection timings of the two detection elements is earlier. However, there are cases in which the operation direction of the user is the same direction, but the detection timing is inverted according to the installation place of the sensor, and this example will be described below.

FIGS. 11A to 11D are diagrams illustrating relations between the installation place of the sensor and the detection timing.

FIG. 11A is a front view of the pyroelectric sensors 11 and 12, and the four detection elements have the sensing areas 401a, 401b, 402a, and 402b as illustrated in FIG. 5A. The sensors are installed so that among the sensing areas 401a, 401b, 402a, and 402b, the sensing areas 402a and 402b of the sensor 12 are formed at the projection plane 2 (the projection video 200) side.

FIG. 11B illustrates an example in which the sensors 11 and 12 are installed below the vertical projection plane 2, and the sensing areas 401b and 402b are formed at the left side when viewed from the user, and the sensing areas 401a and 402a are formed at the right side. For example, when the user 3 performs the swiping operation from left to right in this state, the elements of the sensing areas 401b and 402b first react to the motion of the user.

Figure 11C:
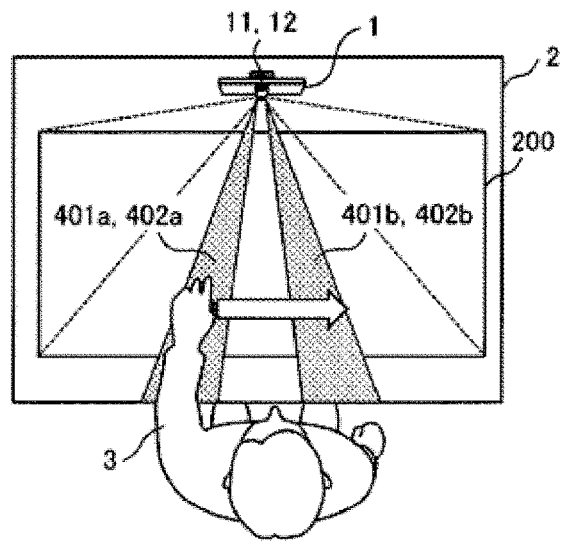

FIG. 11C illustrates an example in which the sensors 11 and are installed in front of the vertical projection plane 2, and the sensing areas 401a and 402a are formed at the left side when viewed from the user, and the sensing areas 401b and 402b are formed at the right side. For example, when the user 3 performs the swiping operation from left to right in this state, the elements of the sensing areas 401a and 402a first react to the motion of the user. Thus, in the sensor installations of FIGS. 11B and 11C, the detection timings of the two elements in the sensor on the operation of the user are inverted.

Figure 11D:
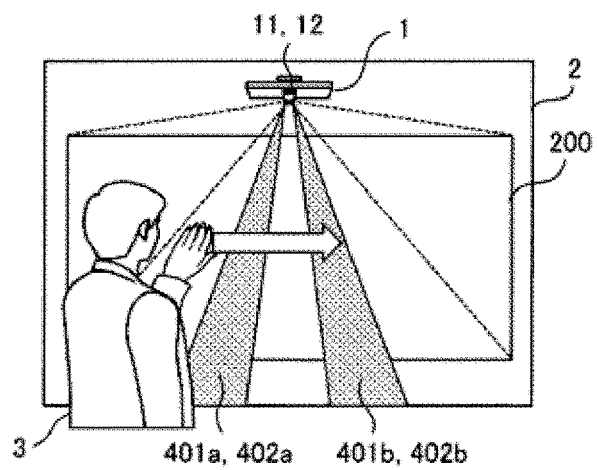

FIG. 11D illustrates an example in which the sensors 11 and 12 are installed above the vertical projection plane 2, and the sensing areas 401a and 402a are formed at the left side when viewed from the user, and the sensing areas 401b and 402b are formed at the right side. For example, when the user 3 performs the swiping operation from left to right in this state, the elements of the sensing areas 401a and 402a first react to the motion of the user, and the detection timing is the same as that in the installation of FIG. 11C.

As described above, the detection timing of the sensor on the operation of the user is inverted according to the installation of the sensor. In order to prevent this, the operation direction of the user can be correctly detected by inverting a timing determination process performed by the operation detecting units 13 and 14 according to an installation form of the display device 1.

As another modified example, a movable mechanism may be installed in the sensor to adjust the sensing area.

FIGS. 12A to 12D are diagrams illustrating examples in which the movable mechanism is installed in the sensor to adjust the sensing area. In FIG. 12A, a support stand 500 on which the sensor 300 is placed is tilted to change the direction of the sensing area 400 to be formed through a movable lens 510. In FIG. 12B, the shape of the movable lens 510 is changed to change an angular width of the sensing area 400. In FIG. 12C, a movable shielding plate 520 is opened or closed to change the angular width of the sensing area 400. FIG. 12D is an example of a sensor that performs line scanning with a laser 530, and an inclination angle of a variable angle mirror 540 that reflects a laser is changed to change the direction of the sensing area. The methods of FIGS. 12A to 12D may be combined.

In the above description, the two pyroelectric sensors each of which includes the two detection elements are used, but four sensors each of which includes one detection element may be used, or one sensor including four detection elements may be used. Alternatively, when a sensor is configured such that a total of the number of detection elements is 4 or lager, and more sensing areas are set, it is possible to detect a fine operation of the user. By installing the movable mechanism in the sensor as illustrated in FIGS. 12A to 12D, a plurality of sensing areas can be implemented through one sensor, and the number of sensors can be reduced.

As the sensor, a thermopile type sensor capable of detecting an absolute temperature in each element may be used instead of the pyroelectric sensor. Alternatively, photography may be performed using a camera such that an upper portion of a camera image corresponds to the sensing area of the sensor 11, and a lower portion of the camera image corresponds to the sensing area of the sensor 12, and the operation of the user may be detected by analyzing the image of the upper portion and the image of the lower portion. Alternatively, a sensor of a time-of-flight scheme of irradiating with light and acquiring a distance to an object, a sensor of a structured light scheme, or the like may be used. Alternatively, a distance measuring sensor, an ultrasonic sensor, a capacitive sensor, a light detecting sensor, or the like may be used.

According to the present embodiment, the sensing area is set according to whether the projection plane is vertical or horizontal, and the sensing area when the projection plane is horizontal is narrower than the sensing area when the projection plane is vertical. Thus, it is possible to accurately detect the operation of the user regardless of whether the projection plane is vertical or horizontal, and the operability of the user on the projection type video display device is improved.

Second Embodiment

In a second embodiment, a method of more accurately detecting the operation of the user by changing the use of the sensor according to the direction of the projection plane will be described.

Figure 13A:
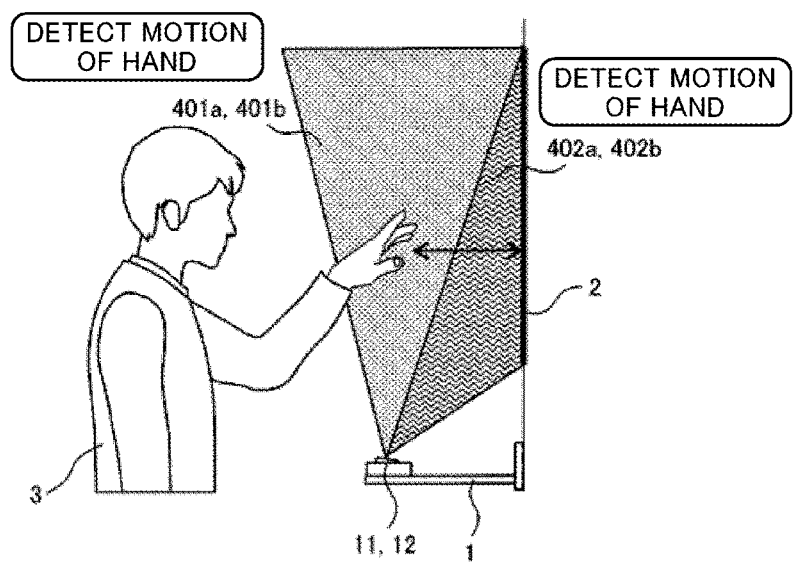
FIGS. 13A and 13B are diagrams illustrating examples of changing the use of a sensor according to a direction of a projection plane (a second embodiment).
Figure 13B:
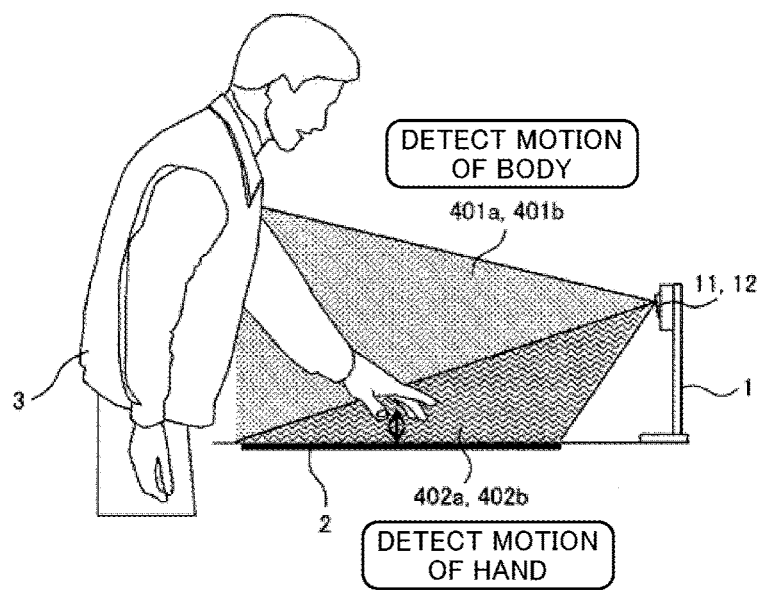

FIGS. 13A and 13B are diagrams illustrating an example of changing the use of the sensor according to the direction of the projection plane. FIG. 13A illustrates an example in the case of the vertical projection plane, and FIG. 13B illustrates an example in the case of the horizontal projection plane.

In the case of the vertical projection plane of FIG. 13A, similarly to the first embodiment (FIG. 8), both the sensing areas 401a and 401b of the sensor 11 and the sensing areas 402a and 402b of the sensor 12 are set to be valid, and the motion of the hand of the user 3 is detected in both of the areas.

In the case of the horizontal projection plane of FIG. 13B, the sensing areas 401a and 401b of the sensor 11 are set to be valid, and the body of the user 3 is detected. The motion of the hand of the user 3 is detected in the sensing areas 402a and 402b of the sensor 12. It is possible to newly detect the presence or absence of the user 3 by detecting the body of the user 3 through the sensor 11. The operation detecting unit 13 determines that there is no user in front of the display device (or the projection plane 2) when there is no detection signal from the sensor 11 during a certain period of time (or a signal is small). The detection result (the absence of the user) is transferred to the display function unit 20. When the user is absent, it is unnecessary to continuously project the video, and thus the control unit 24 performs, for example, a process of causing the projecting unit 21 to stop projecting the video or turning off the power of the display device 1. Thus, unnecessary power consumption can be suppressed.

Figure 14:
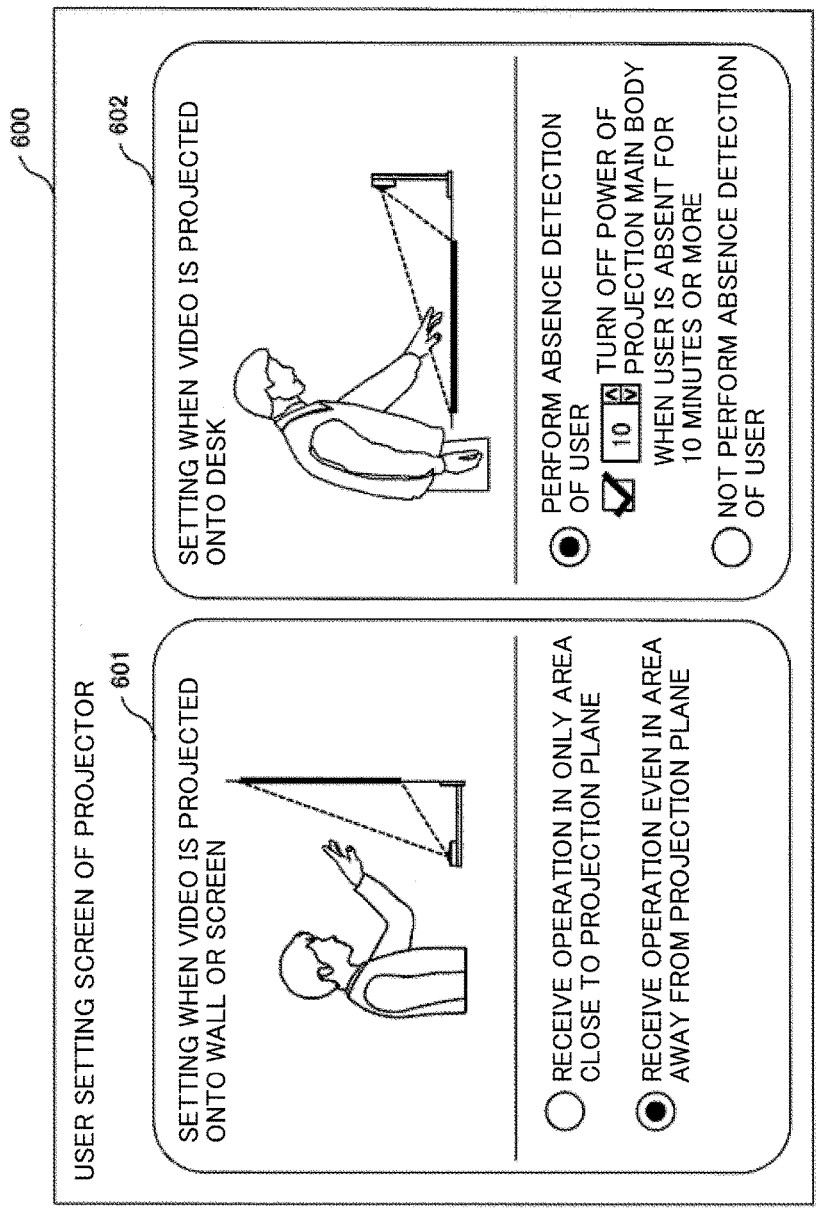
FIG. 14 is a diagram illustrating an example of a user setting screen related to the use of a sensor.

FIG. 14 is a diagram illustrating an example of a user setting screen related to the use of a sensor. For example, a user setting screen 600 is displayed on the projection plane 2 through the projecting unit 21, and the user performs a setting through a remote controller, a button, a switch, or the like. A setting screen 601 when a video is projected onto a wall or a screen and a setting screen 602 when a video is projected onto a desk are displayed on the user setting screen 600.

In the setting screen 601, an area in which the hand of the user is detected in the case of the vertical projection plane is selected. Here, it is selected whether an operation is received only in an area close to the projection plane or an operation is received even in an area away from the projection plane.

In the setting screen 602, it is selected whether or not the absence detection of the user is performed in the case of the horizontal projection plane. At this time, a period of time until the power of the main body of the display device (projector) 1 is turned off after the absence is detected may be set.

By setting the user setting screen, it is possible to operate the display device according to the body of the user or the use of the user.

Figure 15:
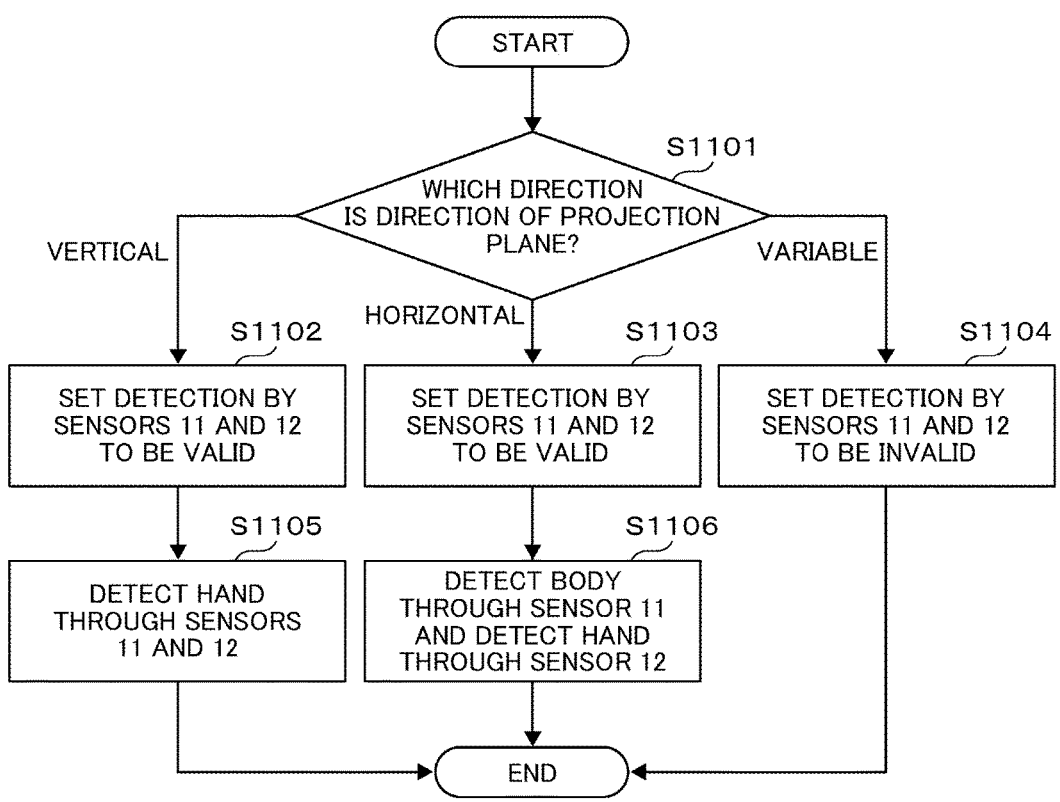
FIG. 15 is a flowchart illustrating a sensing area setting process.

FIG. 15 is a flowchart illustrating a sensing area setting process.

First, in S1101, the installation state detecting unit 22 determines the direction of the projection plane. The process proceeds to S1102 when the direction of the projection plane is vertical, proceeds to S1103 when the direction of the projection plane is horizontal, and proceeds to S1104 when the direction of the projection plane varies.

In S1102, both of the detections by the sensors 11 and 12 are set to be valid, and the process proceeds to S1105, and a setting is performed so that the hand is detected through the sensors 11 and 12.

In S1103, both of the detections by the sensors 11 and 12 are set to be valid, and the process proceeds to S1106, the body is detected through the sensor 11, and the hand is detected through the sensor 12.

In S1104, both of the detections by the sensors 11 and 12 are set to be invalid. By performing the above flow repeatedly, it is possible to cope with even the case in which the direction of the projection plane is changed in the middle.

According to the present embodiment, by changing the use of the sensor according to whether the projection plane is vertical or horizontal, it is possible to more accurately the operation of the user according to the direction of the projection plane, and operability and usability of the user on the projection type video display device are improved.

Third Embodiment

In a third embodiment, a method of more accurately detecting the operation of the user by setting the sensing area according to the position of the user in addition to the direction of the projection plane will be described.

FIGS. 16A and 16B are diagrams illustrating an example of setting the sensing area according to the position of the user.

FIG. 16A is a top view illustrating the position of the user and illustrates an example in which the projection plane 2 is horizontal, and two users 3 and 3' stand at both sides other than the front side of the display device 1. FIG. 16B is a side view illustrating the sensing area in this case, and two sensors 11 and 12 are set to be valid, and a setting is performed so that the hand of the user is detected in sensing areas 401a, 401b, 402a, and 402b of both sensors.

When the projection plane is horizontal, in the first embodiment (FIG. 8B), the user is assumed to standby in front of the display device 1, only the sensing areas 402a and 402b of the sensor 12 are set to be valid, and the sensing areas 401a and 401b of the sensor 11 are set to be invalid. On the other hand, in the present embodiment, the position of the user is considered. Since the users 3 and 3' stand at both sides of the display device 1 as illustrated in FIG. 8A, the body other than the hand of the user does not enter the sensing area 401a and 401b of the sensor 11s, and the hand can be detected through the sensor 11. In this case, the sensor 11 is also used to detect the hand, and thus the sensing area can be expanded, and the detection accuracy of the operation of the user is consequently improved. The same applies even when the user is one person.

It can be determined whether or not the user is in front of the display device 1 based on the detection signal of the sensor 11. When the user is in front of the display device 1, the detection signal of the sensor 11 is consistently large, but when the user is not in front of the display device 1, the detection signal of the sensor 11 is small. Alternatively, it can be also determined whether or not the user is in front of the display device 1 based on a ratio of a period of time in which the detection signal is large and a period of time in which the detection signal is small.

When the projection plane is vertical, the position of the user is substantially fixed, and thus the sensing area is set similarly to the first embodiment.

FIG. 17 is a flowchart illustrating a sensing area setting process.

First, S1201, the installation state detecting unit 22 determines the direction of the projection plane. The process proceeds to S1202 when the direction of the projection plane is vertical, proceeds to S1203 when the direction of the projection plane is horizontal, and proceeds to S1204 when the direction of the projection plane varies.

In S1202, both of the detections by the sensors 11 and 12 are set to be valid, and the process proceeds to S1205, and a setting is performed so that the hand is detected through the sensors 11 and 12.

In S1203, both of the detections by the sensors 11 and 12 are set to be valid, and the process proceeds to S1206, it is determined whether or not the sensor 11 consistently detects a motion. When the sensor 11 is determined to consistently detect a motion, the user is determined to be in front of the display device 1, and the process proceeds to S1207, and a setting is performed so that the hand is detected through the sensor 12. When the sensor 11 does not consistently detect a motion, the user is determined not to be in front of the display device 1, and the process proceeds to S1205, and a setting is performed so that the hand is detected through the sensors 11 and 12.

In S1204, both of the detections by the sensors 11 and 12 are set to be invalid. By performing the above flow repeatedly, it is possible to cope with even the case in which the direction of the projection plane is changed in the middle.

According to the present embodiment, when the projection plane is horizontal, the sensing area is set according to an arrangement of the user, and thus it is possible to expand the sensing area and more accurately detect the operation of the user.

The above embodiments are examples for describing the present invention, and the present invention is not limited to the above embodiments. Further, some components of a certain embodiment may be replaced with components of another embodiment, and components of another embodiment may be added to components of a certain embodiment.

REFERENCE SIGNS LIST 1 projection type video display device
2 video projection plane
3 user
10 detection function unit
11, 12 sensor (pyroelectric sensor)
13, 14 operation detecting unit
15, 23 communication unit
16, 24 control unit
20 display function unit
21 video projecting unit
22 installation state detecting unit
31 detection result data
32 installation state data
200 projection video
300 the pyroelectric sensor
300a, 300b detection element
310 Fresnel lens
400a, 400b, 401a, 401b, 402a, 402b the sensing area
500 support stand
510 movable lens
520 movable shielding plate
530 laser
540 variable angle mirror
600 user setting screen

The invention claimed is:

1. A projector, comprising:
a video projecting unit that displays a video by projecting the video onto a video projection plane;
an installation state detector that detects an installation state of the projector and distinguishes a horizontal plane projection state and a vertical plane projection state, based on gravity;
a sensor that detects that an operator operates the projector;
an operation detecting unit that detects a motion of the operator based on an output of the sensor; and
a control unit that controls the video projecting unit based on a detection result of the operation detecting unit,
wherein the sensor switches a sensing area among a plurality of sensing areas including a sensing area for the horizontal plane projection state and a sensing area for the vertical plane projection state, based on detection result of the installation state detector,
wherein the sensing area of the sensor for the vertical plane projection state is configured to have a plurality of partial sensing areas including first partial sensing area and second partial sensing area,
wherein central axis of the first partial sensing area is configured to intersect with a plane including the video projection plane,
wherein central axis of the second partial sensing area is configured not to intersect with a plane including the video projection plane, and
wherein, the first partial sensing area is included in the sensing area of the sensor for the horizontal plane projection state, and the second partial sensing area is not included in the sensing area of the sensor for the horizontal plane projection state.

2. The projector according to claim 1,
wherein the sensor is configured with a plurality of sensors having different sensing areas, and
the sensing area of the sensor is changed by switching a validity and invalidity of each sensor.

3. The projector according to claim 1,
wherein a movable mechanism for adjusting the sensing area is attached to the sensor.

4. The projector according to claim 1,
wherein the sensor is configured with a plurality of sensors having different sensing areas, and
an object to be detected is set for each sensor.

5. The projector according to claim 1,
wherein, when the direction of the video projection plane or an installation state of the projector varies, an operation of the sensor or the operation detecting unit is stopped.

6. The projector according to claim 1,
wherein, in the vertical plane projection state, the sensing area of the sensor is switched according to a position of the sensor relative to the video projection plane, and the sensing area of the sensor when the sensor is above the video projection plane is narrower than the sensing area of the sensor when the sensor is below the video projection plane.

7. The projector according to claim 1,
wherein the sensor is a pyroelectric sensor in which two pyroelectric detection elements are arranged side by side.

* * * * *